(12) United States Patent
Fröhlich et al.

(10) Patent No.: US 10,393,513 B2
(45) Date of Patent: Aug. 27, 2019

(54) LASER SCANNER AND METHOD FOR SURVEYING AN OBJECT

(71) Applicant: ZOLLER + FRÖHLICH GMBH, Wangen im Allgäu (DE)

(72) Inventors: Christoph Fröhlich, Wangen (DE); Markus Mettenleiter, Isny (DE)

(73) Assignee: ZOLLER + FRÖHLICH GMBH, Wangen im Allgäu (DE)

( * ) Notice: Subject to any disclaimer, the term of this patent is extended or adjusted under 35 U.S.C. 154(b) by 0 days.

(21) Appl. No.: 15/551,019

(22) PCT Filed: Feb. 15, 2016

(86) PCT No.: PCT/EP2016/053145
§ 371 (c)(1),
(2) Date: Aug. 14, 2017

(87) PCT Pub. No.: WO2016/128575
PCT Pub. Date: Aug. 18, 2016

(65) Prior Publication Data
US 2018/0038684 A1   Feb. 8, 2018

(30) Foreign Application Priority Data

Feb. 13, 2015  (DE) .................. 10 2015 102 128
Aug. 13, 2015  (DE) .................. 10 2015 113 381

(51) Int. Cl.
*G01B 11/24*   (2006.01)
*G01S 17/89*   (2006.01)
*G01S 17/02*   (2006.01)
*G01S 7/497*   (2006.01)
*G01S 17/42*   (2006.01)
*G01S 7/48*    (2006.01)
*G01C 21/02*   (2006.01)

(52) U.S. Cl.
CPC .............. *G01B 11/24* (2013.01); *G01C 21/02* (2013.01); *G01S 7/4808* (2013.01); *G01S 7/497* (2013.01); *G01S 17/023* (2013.01); *G01S 17/42* (2013.01); *G01S 17/89* (2013.01)

(58) Field of Classification Search
CPC ......... G01B 11/24; G01C 21/02; G01S 17/89; G01S 7/4808; G01S 17/023; G01S 17/42
See application file for complete search history.

(56) References Cited

U.S. PATENT DOCUMENTS 9,041,915 B2 *  5/2015  Earhart ................ G01S 3/7867
                                              356/220
9,134,339 B2 *  9/2015  Becker ................. G01B 11/26
(Continued)

FOREIGN PATENT DOCUMENTS

DE   10 2006 024 534 A1   11/2007
DE      101 50 436 B4      5/2008
(Continued)

OTHER PUBLICATIONS

Nov. 19, 2015 German Search Report issued in Patent Application No. 10 2015 102 128.5.
(Continued)

*Primary Examiner* — Sang H Nguyen
(74) *Attorney, Agent, or Firm* — Oliff PLC

(57) ABSTRACT

A laser scanner is designed to include a GPS signal-independent navigation unit.

7 Claims, 2 Drawing Sheets

(56) References Cited

U.S. PATENT DOCUMENTS

Figure 1:
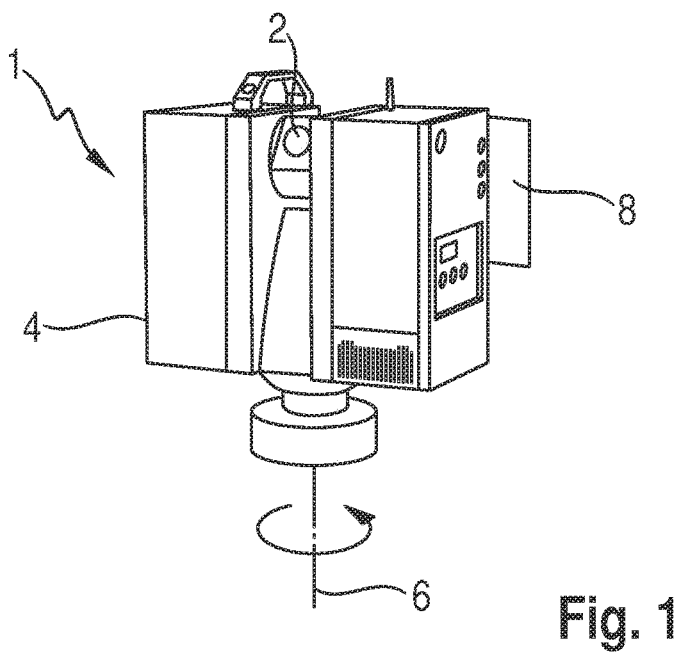

| | | | |
|---|---|---|---|
| 2006/0006309 A1 | 1/2006 | Dimsdale et al. | |
| 2011/0137608 A1* | 6/2011 | Wang | G01C 21/20 702/150 |
| 2011/0140873 A1* | 6/2011 | Stahlin | B60K 37/06 340/438 |
| 2011/0282578 A1* | 11/2011 | Miksa | G01C 11/04 701/532 |
| 2012/0044476 A1* | 2/2012 | Earhart | G01S 3/7867 356/4.01 |
| 2014/0037136 A1* | 2/2014 | Ramalingam | G06T 7/73 382/103 |
| 2014/0104051 A1* | 4/2014 | Breed | G06K 9/00791 340/435 |
| 2014/0176677 A1* | 6/2014 | Valkenburg | G01B 11/002 348/46 |
| 2014/0379254 A1* | 12/2014 | Miksa | G01C 21/32 701/450 |
| 2015/0085301 A1* | 3/2015 | Becker | G01B 11/26 356/608 |
| 2015/0202770 A1* | 7/2015 | Patron | G05D 1/024 700/245 |
| 2015/0369618 A1* | 12/2015 | Barnard | H05B 37/0272 701/491 |
| 2016/0154112 A1* | 6/2016 | Nichols | G01S 19/215 342/357.47 |
| 2016/0223652 A1* | 8/2016 | Bosse | G01S 17/42 |
| 2016/0377707 A1* | 12/2016 | Sasaki | G01S 7/497 356/4.01 |

FOREIGN PATENT DOCUMENTS

| | | |
|---|---|---|
| DE | 10 2009 035 336 B3 | 11/2010 |
| DE | 20 2010 013 825 U1 | 2/2011 |
| DE | 10 2008 034 198 B4 | 1/2014 |
| DE | 10 2013 102 286 A1 | 1/2014 |

OTHER PUBLICATIONS

Katz, R. "Integrated Sensing Framework for 3D Mapping in Outdoor Navigation". Intelligent Robots and Systems, pp. 2264-2269, 2006.

Dec. 5, 2016 International Search Report issued in International Patent Application No. PCT/EP2016/053145.

Aug. 15, 2017 International Preliminary Report on Patentability issued in International Patent Application No. PCT/EP2016/053145.

* cited by examiner

LASER SCANNER AND METHOD FOR SURVEYING AN OBJECT

The invention relates to a laser scanner according to the preamble of claim 1 and to a method for surveying an object by means of a scanner of this kind.

The 3D survey of objects by means of laser scanners has gained increasing importance in practice. In the case of complex objects or objects which are difficult to access, a plurality of lasers scans are always taken successively from different locations and are stored in a common project file. Then they have to be transferred to a common superordinate coordinate system. This process is called "recording". For calculating the transformations of the individual locations in the superordinate coordinate system it is necessary to find individual points known in the superordinate system in the respective scans and to calculate a transformation by the position thereof, which is then applied to the entire point cloud.

Furthermore, the position of the searched points in the scan must be known very precisely since otherwise the transformation cannot be calculated correctly and the position of the different laser scans, both with respect to each other and to the superordinate coordinate system, is only given with little exactness. For this reason—as described in DE 10 2008 034 198 B4 of the applicant—a plurality of targets have so far been applied in the environment to be surveyed, on which a characterization, e.g. a running number, is printed for identification and is detected manually during evaluation. For the purpose of safeguarding quality, all targets should be calibrated tachymetrically with a so-called "total station" and should be noted down—this process involves additional surveying effort and requires additional surveying expertise.

For reducing this effort it is possible to perform a targetless recording of the three-dimensional point clouds. Recording is then performed largely automatically by means of the information from the object surveying points. It is, however, necessary that the object has certain particularities enabling an unambiguous automatic allocation of the individual scans. Real environments, however, often comprise ambiguities (e.g. columns at always the same intervals in a production hall or always the same doors in office corridors) which may lead to faulty assignments. Also, since often several hundreds of laser scans are taken, it is, due to the related exponential calculation time increase, for the purpose of automatic recording not possible to compare each scan with every further scan.

Recording only with respect to the previous scan is not always practicable, for instance, if it is positioned behind a shadowing. For this reason, a certain pre-orientation (position and orientation) of the scans to be recorded is usually indispensable, and has been performed so far manually by "twisting"/"shifting" the location in the electronic field book.

For automatic recording, however, this pre-orientation also has to be performed automatically, for which purpose an estimation of the current location from sensor data is required.

It is known to detect, for automatic recording, the individual positions of the locations of the laser scanner during scanning by means of a GNSS (Global Navigation Satellite System)—in the following called GPS system. This is, however, only possible in the case of outdoor surveying, wherein adequate GPS quality has to exist to achieve the required preciseness. In the case of indoor surveys the detection of the scanner position by means of GPS systems is very error-prone or impossible. Moreover, GPS data do not comprise information with respect to the orientation of the laser scanner.

DE 20 2010 013 825 U1 illustrates a laser scanner for the 3D survey of objects in which a laser beam is, by means of a beam deflection system, directed on the respective object to be surveyed and the surveying beam reflected therefrom is evaluated by an evaluation unit.

The laser scanner has a navigation device for detecting the scanner position, so that it is possible to record scans taken from different locations (point clouds) in a superordinate coordinate system.

A problem here is that the respective location can only be estimated or detected coarsely by means of the navigation device, so that the preciseness of coupling, i.e. the locations detected by the navigation device and the recording performed on the basis of these locations, may be imprecise.

As compared to this it is an object of the invention to provide a laser scanner and a method which enable more precise surveying of objects with little effort and fully automatically to a large extent.

With respect to the laser scanner this object is solved by the feature combination of claim 1, and with respect to the method by the features of the independent claim 6.

Advantageous further developments of the invention are the subject matter of the subclaims.

In accordance with the invention the laser scanner for 3D survey of objects comprises an emitter for emitting a laser beam, a mechanical beam deflecting system for deflecting the laser beam such that 3D object survey is possible, and an evaluation unit for evaluating the survey beam reflected by the object. The laser scanner is further provided with a navigation device for detecting the scanner position. The navigation device has a navigation unit for the GNSS/GPS signal-independent determination of the scanner position and scanner orientation relative to a basic position of the scanner. In accordance with the invention the scanner position (location) estimated by the navigation unit is rendered precise/corrected after the recording of the respective scan and the resulting more precise detection of the location, so that the coupling of the individual scanner positions when surveying a complex object by the navigation unit is performed distinctly more precisely than in the state of the art in which no "update"/calibration of the position of the navigation unit is performed.

A navigation unit of this kind enables an adequate determination of the respective scanner positions relative to a basic position, so that the positions of the laser scanner, when scanning the object from different locations, are correspondingly also known relative to each other, and automatic recording with adequate preciseness is possible on the basis of these values.

Even if GNSS/GPS reception or another signal utilizable for navigation/position detection is missing, a position change of the scanner from one location to the next one is relatively coupled by the navigation unit, so that it is determined with adequate preciseness. This coupled (estimated) location is then corrected with the aid of the location determined by the recording and hence the navigation unit is quasi calibrated, so that the location chosen in the next step can be detected with higher preciseness.

Surveying preciseness can still be increased if the navigation unit is provided with a barometer, a compass and/or a GNSS-/GPS receiver, so that correspondingly the height of the scanner is also known and/or the surveying preciseness with available GNSS/GPS signals can be improved. Other auxiliary means for location estimation, such as known WLAN locations (RSS evaluation) or runtime evaluation in GSM or LTE networks (mobile phone) or via Bluetooth Beacons or UWB systems or photogrammetry or odometry, may also be used.

The laser scanner may be provided with an internal or external evaluation unit for the targetless recording of a plurality of scans as a function of the respective laser position and laser orientation.

The largely automated evaluation of the scans is facilitated if the scanner is provided with a memory for storing the location data determined by the navigation unit.

The method in accordance with the invention for surveying an object by means of a scanner of this kind comprises inter alia a step for determining a starting or basic position of the scanner by means of the navigation unit, from where the first scan is performed. In a further step this first scan is then made, and recording of the scan in a superordinate coordinate system is performed on the basis of this basic position, for instance, by targets already surveyed and visible in this scan, or by other objects with a known position. If a superordinate coordinate system should not be required, the first position may simply be set to the zero point [0,0,0] of the relative coordinate system. The location of the scanner is then used as a starting position for the displacing of the laser scanner to the next location, wherein the relative movement of the scanner is coupled by means of the navigation unit, so that the next location may be estimated relative to the previous one. The position is then determined by a targetless or else target-based recording with higher preciseness and—as explained before—the location detected by the navigation unit is corrected appropriately. This method is then repeated until the object has been surveyed completely. The resulting scans are recorded with comparatively high preciseness and with no or just minimal manual interference in a common coordinate system, so that the subsequent evaluation of the scans may take place in a very simple manner and possibly already on the spot.

On the basis of the recording of a scan a correction of the estimation of the previous scan is performed by the transformation result of the recording, wherein the navigation unit is preferably corrected appropriately.

The basic position of the first scan may be performed in a method by means of GNSS data or available objects or targets with known coordinates.

Figure 2:
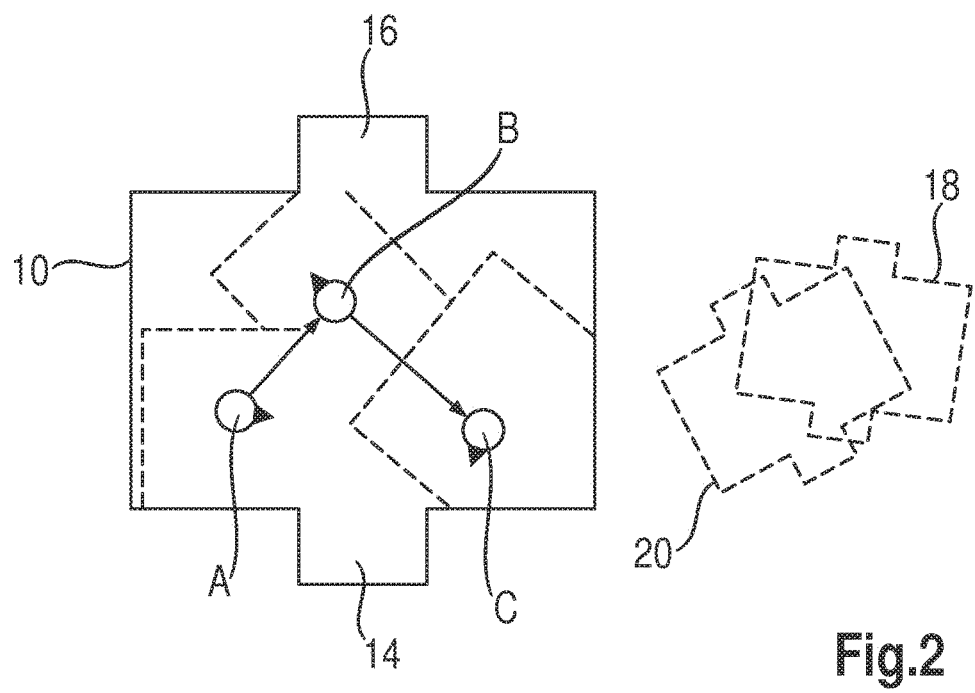
Figure 3:
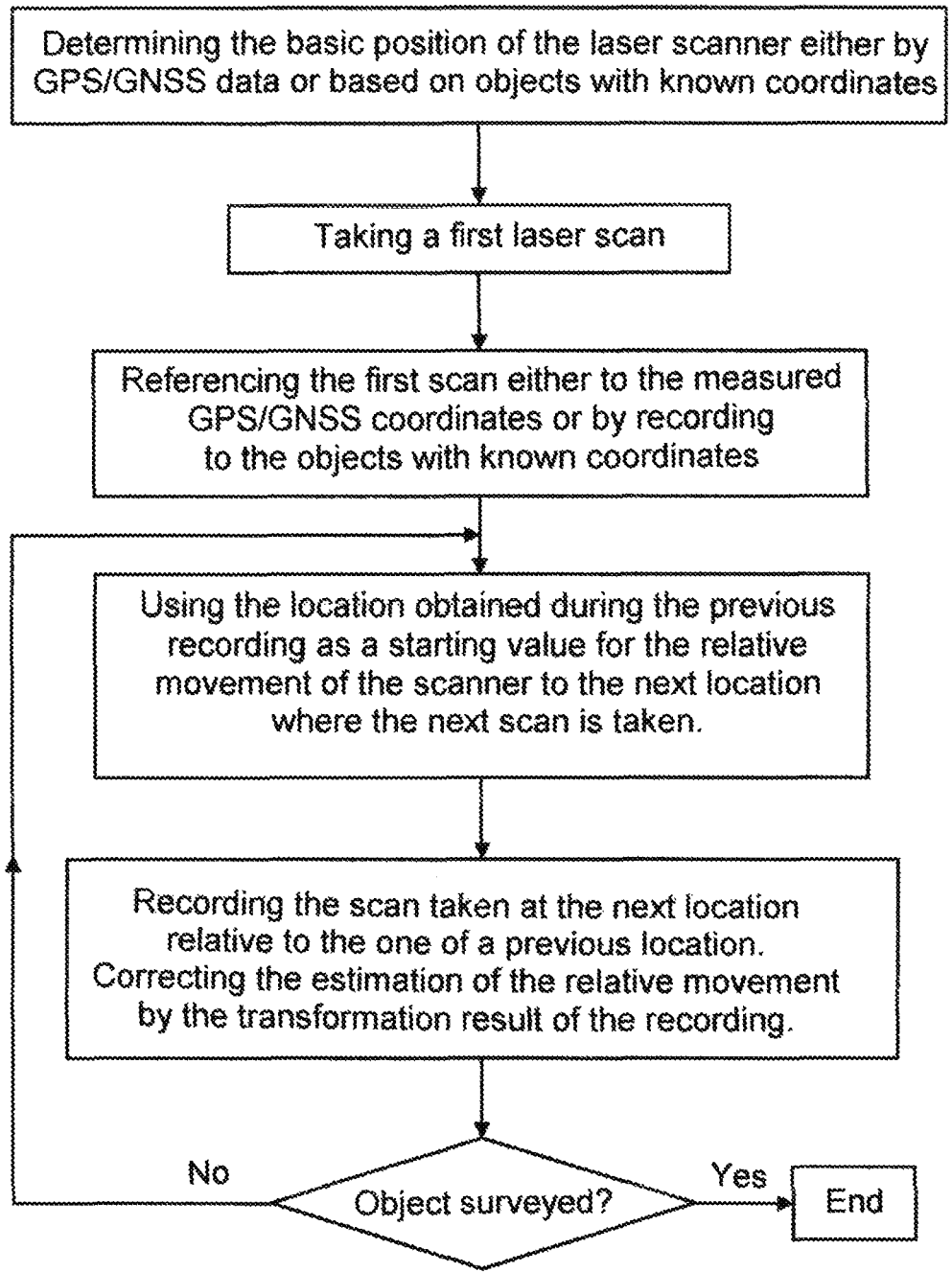

The invention will be explained in detail in the following by means of schematic drawings. There show:

FIG. 1 a schematic representation of a laser scanner in accordance with the invention;

FIG. 2 a schematic diagram of the surveying of an object by taking a plurality of scans; and FIG. 3 a strongly simplified sequence for recording the scans taken in a superordinate coordinate system.

FIG. 1 illustrates a schematic representation of a laser scanner 1 in accordance with the invention, whose basic structure corresponds to the laser scanner "Imager®" distributed by the applicant. Further details of a laser scanner of this type are, for instance, described in DE 101 50 436 B4 or in DE 10 2006 024 534 A1. A laser scanner 1 of this type has a rotating sensing head 2 which rotates about a horizontal axis (view pursuant to FIG. 1) and via which a laser beam is directed on an object to be surveyed. The initially explained emitting and receiving unit of the laser scanner 1 is arranged in a housing 4 which is pivotable about a vertical axis 6. The object to be surveyed may be scanned almost completely by pivoting the housing 4 about 180° while the sensing head 2 is rotating, wherein the area below the sensing head which is covered by the housing cannot be detected. With respect to further details, reference is made to the afore-mentioned document.

For facilitating recording, the laser scanner 1 is provided with a navigation unit 8, preferably an inexpensive MEMS (Micro Electronic Mechanical System) type. It comprises accelerometers, gyroscopes, barometers, magnetometers, and a conventional GNSS (e.g. GPS) receiver. Via the first-mentioned components it is possible, irrespective of the availability of a GNSS signal, to detect the orientation and the relative position of the laser scanner with respect to a known starting or basic position.

This means, via these components it is possible to couple a position change of the laser scanner 1 with respect to the original basic position, so that the following location can be estimated with adequate preciseness. High preciseness is not required since it is not the exact scanner location (1 millimeter preciseness) that has to be determined, but merely a coarse estimated value (1-2 m preciseness) which serves as a starting value for the automatic recording. The laser scanner 1 is further designed with a memory for the position data detected by the navigation unit. The exact location determined on the basis of the recording is then used for correction/calibration of the navigation unit.

FIG. 2 illustrates in a strongly simplified manner the surveying of a space 10 by means of a laser scanner 1 of this type. This space 10 is, for instance, designed with characteristic sections, for instance, oriel-shaped projections 14, 16. Such a space, which may additionally be provided with a plurality of partition walls, can usually not be detected by one single scan. Accordingly, several, in the instant case three, scans have to be taken from different positions. Since an interior space is concerned here, no GPS signal is available.

It is assumed that a first location A of the laser scanner 1 is either known in an existing coordinate system or is first of all assigned with the relative coordinates [0,0,0] for the sake of convenience. The orientation of the laser scanner (local coordinate system) is indicated with the black arrow. A first measurement (taking of a 3D point cloud) is made from the location A.

The laser scanner 1 is then taken to the location B, wherein the position change of the laser scanner 1 is coupled by the navigation unit 8, so that the location B where the laser scan B is taken can be estimated in the position and orientation of the laser scanner with sufficient preciseness with respect to the location A. This estimation serves for the recording software as a starting value for the automatic, targetless recording from scan B to scan A. After the recording the relative position from location B to location A is known with very high preciseness. This is used to exactly calculate the location B (which had only been estimated before). This result is retransferred to the navigation system in the laser scanner, so that it also knows the exact location B. There is quasi performed an update of the location determined by means of the navigation system.

In a subsequent step the laser scanner 1 is then taken from location B to location C, and this change of position is again coupled by the navigation unit 8, so that the relative position of the location C with respect to the location B (and hence to the basic position (location A) may be estimated. The subsequent process corresponds to the one described under location B. In this step, too, inter alia the correction of the location determined with the navigation system takes place on the basis of the location determined by the recording.

No or just minimal manual interference is required to perform recording. Similarly, a plurality of further scans may be taken from different locations, wherein the respective positions are always coupled by the navigation system, starting out from the basic position A or the last location—the automatic recording is thus also readily possible with complex objects with a plurality of scans. The correction of the navigation system is performed with the data determined by the recording.

The difficulty of the conventional proceeding is indicated in FIG. 2 at the right. Two scans (18/20) taken from two different locations are illustrated. These two scans are first stored in their local coordinate system. Targetless automatic recording is not readily possible here since the scene comprises an ambiguity due to the mirror-invertedly arranged protrusions (14/16)—both scans could also be recorded with a mutual twisting of 180°. The user must therefore perform a manual pre-orientation and must additionally restrict the region of rotational angle of the recording to prevent that it finds the wrong solution.

In the new proceeding, however, due to the automatic estimation of the relative change of the position/orientation between the locations of the scans 18/20 by the navigation system, an adequately good starting value exists for the correct assignment by the automatic targetless recording. Thus, the correct recording is found without manual interference.

FIG. 3 again illustrates essential elements of the surveying method in accordance with the invention. Accordingly, first of all the basic position of the laser scanner 1 is determined for a first survey. Starting out from this basic position (location A) the first scan is taken. By means of the objects or targets with known coordinates in the first scan, it (and hence the basic position) can be recorded in a superordinate coordinate system. The basic position (location A) obtained in this process is then used as a reference for the determination of the new location B, from where a further scan is taken. Since the relative position of this new location B with respect to the location A is detected by the navigation unit 10, this second scan may also be recorded in the superordinate coordinate system. The navigation unit and/or the estimated location determined by it is/are then corrected on the basis of the recorded location.

Correspondingly, the taking of further scans is performed until the object has been surveyed completely—the individual scans are then recorded in the superordinate coordinate system in the kind of a field book.

The navigation system 10 which is designed in MEMS architecture indeed comprises usually some not unsubstantial drift, but this does not play an essential role since the "track", i.e. the change of the scanner location, need not be taken over a long time or a large distance and the scanner does not move away from its position during scanning and/or its movement (rotation about the vertical axis) is known.

The method in accordance with the invention and the laser scanner in accordance with the invention thus enable the very precise quick surveying of objects without noteworthy manual interference during recording. The surveying can also be performed independently of GPS signals, wherein the surveying preciseness may possibly be further improved by a GPS receiver.

Disclosed is a laser scanner designed to include a GPS signal-independent navigation unit.

LIST OF REFERENCE SIGNS 1 laser scanner
2 sensing head
4 housing
6 vertical axis
8 navigation unit (integrated in the scanner)
10 object (space) in plan view
14 projection #1
16 projection #2
18 scan from a first location
20 scan from a second location

The invention claimed is:

1. A laser scanner for a complete indoor or outdoor 3D survey of objects from a basic position and from at least one further position into which the laser scanner is taken, comprising:
   an emitter that emits a laser beam;
   a mechanical beam deflecting system that deflects the laser beam such that 3D object survey is possible;
   a navigation device that determines a scanner position with respect to a basic position of the laser scanner without using GNSS or GPS signals; and
   a first evaluation unit that evaluates a survey beam reflected by an object, the first evaluation unit recording the scans taken at the basic position and at the at least one further position in a superordinate coordinate system in a field book and correcting the scanner position detected by the navigation device, and updating and calibrating the navigation device, based on an automatic recording.

2. The laser scanner according to claim 1, wherein the navigation device comprises at least one of: an accelerometer, a gyroscope, or a magnetometer.

3. The laser scanner according to claim 1, wherein the navigation device comprises at least one of: a barometer, a GNSS receiver, a GPS receiver, or a compass.

4. The laser scanner according to claim 1, further comprising:
   a second evaluation unit that performs automatic targetless recording of a plurality of scans as a function of respective scanner position.

5. The laser scanner according to claim 1, further comprising:
   a memory that stores data determined by the navigation device.

6. A method for surveying the object using the scanner of claim 1, comprising:
   a) Determining the basic position of the laser scanner;
   b) Making a first scan at a first position;
   c) Recording the first scan in a superordinate coordinate system if the object has known coordinates, or setting the basic position to [0,0,0];
   d) Moving the laser scanner to a next position;
   e) Using the scanner position determined by the navigation device or obtained in previous recording as a starting position for estimation of relative movement of the scanner to the next position where a next scan is to be taken;
   f) Automatic targetless recording of the next scan taken at the next location relative to the first scan; and
   g) Repeating steps d) to f) until the object has been completely surveyed,
   wherein a correction of the estimated value determined by the navigation device, and the updating and calibrating of the navigation device, is made based on the automatic recording.

7. The method according to claim 6, wherein the determining of the basic position is performed using GNSS or GPS data or available objects with known coordinates, respectively.

* * * * *